United States Patent [19]

Walsh

[11] Patent Number: 4,605,363
[45] Date of Patent: Aug. 12, 1986

[54] GEAR PUMP WITH PIVOTED BUSHINGS THAT CAN DEFLECT

[75] Inventor: Richard E. Walsh, Rockford, Ill.

[73] Assignee: Sundstrand Corporation, Rockford, Ill.

[21] Appl. No.: 715,675

[22] Filed: Mar. 25, 1985

[51] Int. Cl.⁴ .................. F04C 2/18; F04C 15/00; F16C 23/04
[52] U.S. Cl. .................. 418/131; 418/206; 384/192; 384/215; 384/302
[58] Field of Search .............. 418/102, 131, 132, 205, 418/206; 384/192, 202, 215, 302

[56] References Cited

U.S. PATENT DOCUMENTS

| | | | |
|---|---|---|---|
| 2,990,783 | 7/1961 | Oliver | 418/102 |
| 3,029,739 | 4/1962 | Nagely | 418/132 |
| 3,309,997 | 3/1967 | Kita | 418/132 |
| 3,574,492 | 4/1971 | Schwary | 418/206 |
| 3,664,777 | 5/1972 | Aoki | 418/131 |
| 4,336,006 | 6/1982 | Grabow et al. | 418/131 |
| 4,482,337 | 11/1984 | Petrzelka | 464/128 |

FOREIGN PATENT DOCUMENTS

| | | | |
|---|---|---|---|
| 178769 | 6/1954 | Austria | 384/215 |
| 1217833 | 12/1959 | France | . |
| 1008726 | 11/1965 | United Kingdom | 418/131 |

Primary Examiner—John J. Vrablik
Attorney, Agent, or Firm—Wood, Dalton, Phillips, Mason & Rowe

[57] ABSTRACT

Rapid wear in a gear pump construction due to shaft deflection during pump operation and of the sort including a housing having an interior wall defining a pumping chamber, opposed inlet and outlet ports meshed gears within the chamber, a pair of shafts mounting the gears and bushings journalling the shafts is avoided by providing at least some of the bushings near their ends remote from the gears and on their sides remote from the outlet with radially outwardly opening slots extending generally transverse to the shafts.

6 Claims, 6 Drawing Figures

GEAR PUMP WITH PIVOTED BUSHINGS THAT CAN DEFLECT

FIELD OF THE INVENTION

This invention relates to gear pumps, and more specifically, spur gear pumps and improved bearing constructions in such pumps.

BACKGROUND OF THE INVENTION

Spur gear pumps conventionally include a housing including a gear chamber. The gear chamber may take on a variety of configurations from that of an oval to the shape of an eight and two meshed spur gears are received within such chamber. To one side of the point at which the gears mesh is an inlet port while on the opposite side of the point of meshing is an outlet port. At other locations about the periphery of the gears, the wall of the gear chamber is in close proximity to the teeth of the gears.

The gears are integral with or mounted on shafts journalled in bearings in the housings and upon rotation of one of the shafts, the gears will rotate in opposite directions. Fluid, normally in the form of a liquid, will be drawn in the inlet and carried by the spaces between the teeth of the gears around the chamber periphery to the outlet. As the teeth of the gear mesh adjacent the outlet, fluid is forced out of the spaces between the teeth under pressure and out the outlet.

By their very nature, gear pumps, and specifically the gears and shafts thereof, are side loaded. Low pressure will be present at the inlet side while high pressure will be present at the outlet side; and the high pressure acts against the gears generally in the direction of the inlet. As a consequence, the pressure tends to cause the shafts mounting the gears to deflect away from the outlet side of the pump.

The amount of shaft deflection is greater adjacent the gears than at locations on the shafts more remote from the gears and as a consequence, the thickness of any lubricant film between the bearings and the shaft journals is substantially reduced or eliminated altogether with the consequence that the bearing and shaft journals adjacent the gears are subject to high wear rates resulting in relatively short operational life of the pump and/or substantial down time.

The art has long recognized this problem and has proposed a variety of solutions including the use of self-aligning bearings, bearings mounted in resilient webs which in turn may deflect to allow the bearing to align with the shafts, and bearings which themselves may pivot to allow the maintenance of a lubricating film of sufficient thickness.

One long known attempt at the latter approach is the use of bearings or bushings for the shafts which have barrel-shaped exterior configuration. This approach is illustrated in, for example, U.S. Letters Patent No. 4,336,006 issued June 22, 1982 to Grabow et al. According to this approach, as the shafts deflect under side loading during operation of the pump, the bearings or bushings journalling the shafts may pivot within the housing to maintain proper journal-shaft alignment. Unfortunately, in most instances, the bearings or journals are provided with planar faces remote from the gears which, in turn, are in abutment with a planar surface of the pumping chamber. As a consequence, the contact between the two planar surfaces tends to resist such pivoting with the consequence that the barrel-shaped exterior configuration of the bushing is not as effective as is desired.

The present invention is directed to overcoming the above problem.

SUMMARY OF THE INVENTION

It is a principal object to provide a new and improved gear pump. More specifically, it is an object of the invention to provide a new and improved bearing or bushing structure for use in gear pumps which does not resist pivoting of the bearing or bushing within the gear pump housing when side loading of the gears occurs during operation of the pump.

The invention is intended for use in a typical gear pump structure including a housing having an interior wall. A pumping chamber is located within the housing and is defined by the interior wall. Opposed inlet and outlet ports are provided in the housing and extend to the chamber and a pair of meshed gears are disposed within the chamber. A pair of shafts are located within the housing and the chamber and each shaft mounts a respective one of the gears. Bushings are disposed within the chamber and journal the shafts and at least some of the bushings and the adjacent portion of the interior wall define an annular space that is narrow medially of the bushings and of increasing width axially toward the ends of the bushings.

The invention contemplates the improvement wherein the bushings, near their ends remote from the gears, at least on their sides remote from the outlet, include radially outwardly opening slots extending generally transverse to the shafts.

As a consequence of this construction, the ends of the bushings remote from the gears may themselves deflect when side loading tends to cause the bushings to pivot within the housing. The deflection of the bushings occurs principally at the end remote from the gear and is accommodated by the presence of the slot.

In a preferred embodiment, the radially outer surface of the bushings are generally barrel-shaped. In a highly preferred embodiment, there are additional ones of the slots on the bushings and located on the sides thereof remote from the inlet and generally opposite of the first mentioned slots to enhance sealing contact between the ends of the bushings and the pump housing.

In a highly preferred embodiment, the bushings have end faces remote from the gears and the interior wall of the housing includes a relief of a radius intermediate the inner and outer radii of the bushings. There is further provided an arcuate groove in the end face radially overlapping the reliefs which thereby provide a pressure relief means at the interface of the end faces and the interior wall.

Other objects and advantages will become apparent from the following specification taken in connection with the accompanying drawings.

DESCRIPTION OF THE PREFERRED EMBODIMENT

Figure 1:
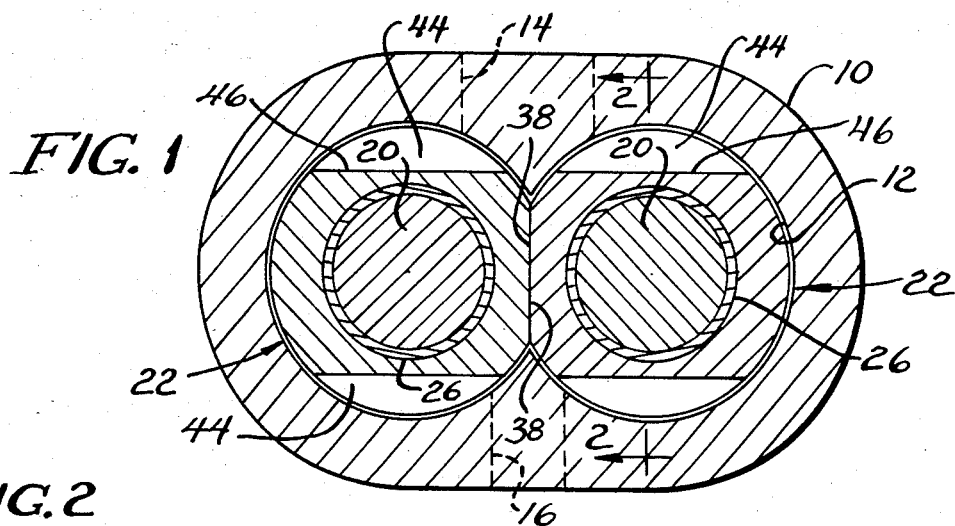
FIG. 1 is a sectional view made according to the invention and taken approximately along the line 1—1 in FIG. 2.
Figure 2:
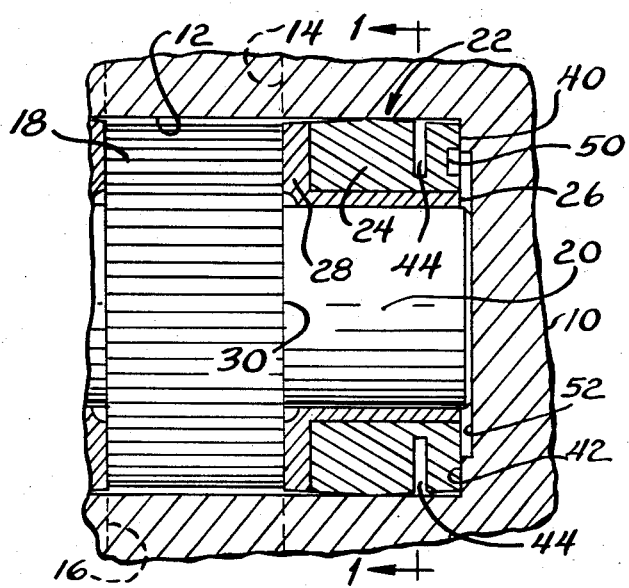
FIG. 2 is an enlarged, fragmentary sectional view taken approximately along the line 2—2 in FIG. 1.

An exemplary embodiment of a gear pump made according to the invention is illustrated in the drawings and with reference to FIGS. 1 and 2 is seen to include a housing 10 provided with a generally eight-shaped interior wall defining a pumping chamber 12. However, it is to be understood that other configurations for the pumping chamber 12 could be employed as desired.

Medially of the pumping chamber 12 and at one side thereof is an inlet 14 and on the opposite side is an outlet 16. As seen in FIG. 2, a pair of gears 18 (only one of which is shown) is disposed within the pumping chamber and each of the gears has an associated shaft 20. In the usual case, only one of the shafts 20 will be driven by suitable means (not shown).

The shafts 20 are received in bushings or bearings, generally designated 22. Each bushing 22 is made up of a radially outer body 24 and a radially inner, sleeve-like journal bearing surface 26. In addition, one side of each of the bushings 22 is provided with a thrust bearing surface 28 which abuts the adjacent side 30 of the corresponding gear 18.

Figure 3:
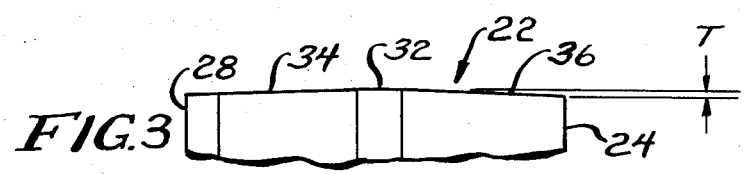
FIG. 3 is a fragmentary, enlarged, somewhat exaggerated view of the exterior surface of a bushing or bearing made in accordance with the invention.

As best seen in FIG. 3, the exterior surface of each of the bushings 22 is generally barrel-shaped. While this could be accomplished by providing the exterior surface with a true curved configuration, for manufacturing purposes, it has been found that the desired configuration can be most easily manufactured by providing a cylindrical section 32 medially of the bearing and flanked by two, mildly frusto-conical sections 34 and 36. As a consequence, when the bushing is disposed within the chamber 34, the exterior surface of the bushing and an adjacent portion of the interior wall defining the pumping chamber 12 define an annular space that is narrow medially of the bushing and of increasing width axially towards both ends of the bushing.

The taper of the frusto-conical sections 34 and 36 is exaggerated in the showing in FIG. 3. In actuality, for a bushing having an axial length of about $\frac{7}{8}$", the taper of each section will be only about 0.0012 inches where the bearing further has an outer diameter of about $1\frac{1}{4}$" and an inner diameter of about $\frac{3}{4}$". As used herein, the taper is defined by the quantity indicated at "T" in FIG. 3.

Figure 4:
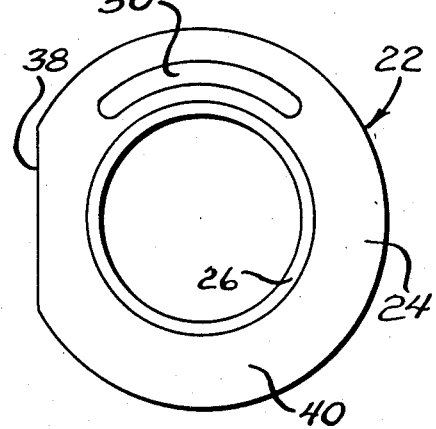
FIG. 4 is an elevational view of an end of the bushing.

In actuality, the exteriors of the bushings 22 are not perfectly barrel shaped. Rather, the bushings 22 on one side of the gears is provided with mating flats 38 as seen in FIGS. 1 and 4 to allow the bushings to be sized generally on the same order as the diameter of the gears and yet provide for the reduction in spacing caused by meshing of the gears within the pump itself. Additionally, the flats 38 serve to prevent rotation of the bushings within the housing about the axes of the shafts.

As seen in FIG. 2, the end of each bushing 22 remote from the corresponding gear 18 is in the form of a generally planar face 40 which abuts a generally planar part 42 of the interior wall defining the pumping chamber 12. Spaced axially toward the gear a short distance, at least on the sides of the bushings 22 remote from the outlet 16 are generally transverse slots 44. The bottoms 46 of the slots 44 are chords in the geometrical sense of the bushing 22. In a bushing constructed to have the dimensions mentioned previously, the slots 44 will be located approximately 1/16" from the end face 40 and will have a maximum depth of about 3/16". As best seen in FIGS. 1 and 2, each bushing is preferably provided with two, diametrically opposite ones of the slots 44 for purposes to be seen.

As seen in FIG. 4, the end faces 40 of the bushings 22 may be provided with arcuate grooves 50. At the same time, the end wall 42 of the pumping chamber 12 may be provided with a recess or relief 52 whose radius is intermediate the inner and outer radii of the bushing 22 and which overlaps the groove 50.

It will be appreciated that, in operation, there will typically be a leakage path between the exterior surface of the bushing 22 and the pumping chamber wall 12. Pressure of fluid in this leakage path may act against the end face 40 to tend to shift the bearings 22 to the left as viewed in FIG. 2 which may be undesirable in many instances. However, the provision of the groove 50 shortens the leakage path in the vicinity of the end face 40 to thereby relieve pressure in the leakage path to minimize the difficulty. Moreover, because the groove 50 is in fluid communication with a low pressure area defined by the relief 52, the groove effectively reduces the area on the face 40 on which high pressure acts, thereby reducing the undesirable shifting force applied to the face 40. Where the bushings 22 are employed on the so-called "fixed bearing side" of the gears 18, which is their preferred disposition according to the invention, a pressure relief means is highly desirable.

Figure 5:
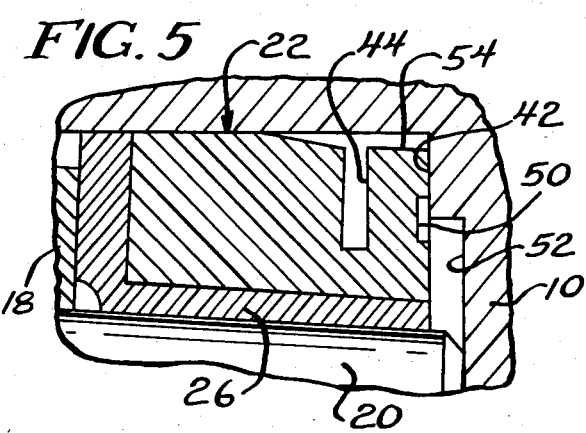
FIG. 5 is an enlarged, fragmentary, sectional, somewhat exaggerated view of the operation of a bushing during deflection of the the shaft of a gear pump during operation of the latter.
Figure 6:
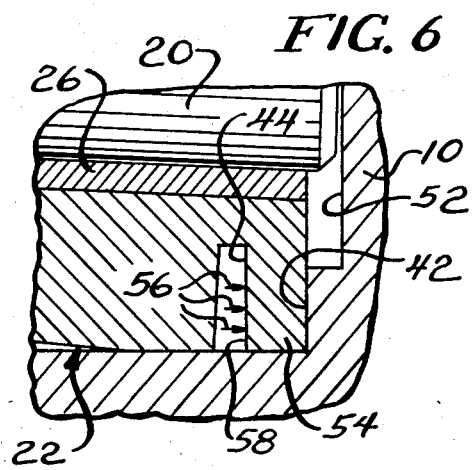
FIG. 6 is a view similar to FIG. 5 but illustrating the diametrically opposite side of the components.

FIGS. 5 and 6 illustrate how a bushing made according to the invention accommodates high shaft deflections without unduly narrowing the lubricant film at the shaft 20 in the axial direction as the gear 18 is approached. In particular, because of the barrel shaped configuration of the exterior of the bushings 22, the same may pivot with the shaft 20 to maintain and preserve proper alignment between the shaft 20 and the journal surface 26 of the bushing 22. In the usual case, the abutment of the end face 40 with the planar end wall 42 would resist such movement. However, because of the presence of the slot 44, the end 54 of the bushing 22 remote from the gear 18 may deflect as shown in FIG. 5. As a consequence, the resistance to pivoting of the bushing 22 is minimized and yet good planar to planar surface sealing is retained in the area of the end face 40 on the planar wall 42 of the housing 10.

The occurrences at the diametrically opposite slot 44 are shown in FIG. 6. In particular, such slot will be filled with high pressure fluid as a result of proximity to the outlet 16 and the leakage paths inherent in gear pump constructions. Such pressurized fluid will act in the direction of arrows 56 on the side 58 of the slot 44 adjacent the bushing end 58 and tend to cause the same to deflect to the right as viewed in FIG. 6 into good sealing engagement with the planar end wall 42. Consequently, greater pump efficiency as a result of reduced leakage is believed to be obtained.

I claim:

1. In a gear pump including:
   a housing having an interior wall;
   a pumping chamber within said housing and defined by said interior wall;
   opposed inlet and outlet ports in said housing extending to said chamber;
   a pair of meshed gears within said chamber;

a pair of shafts within said housing and said chamber, each shaft mounting a respective one of the gears of said pair; and bushings within said chamber journalling said shafts, the radially outer surface of at least some of said bushings and the adjacent portion of said interior wall defining an annular space that is narrow medially of said some bushings and of increasing width axially toward the ends of said some bushings to allow said some bushings to pivot in said housing;

the improvement wherein said some bushings, near their ends remote from said gears, at least on their sides remote from said outlet include radially outwardly opening slots extending generally transverse to said shafts, said slots being sufficiently near said ends and extending sufficiently into said bushings as to allow said ends to deflect relative to the remainder of the associated bushing and sealingly engage the adjacent portion of said interior wall when said some bushings pivot in said housing.

2. The gear pump of claim 1 wherein the radially outer surface of said some bearings is generally barrel shaped.

3. The gear pump of claim 1 wherein there are additional ones of said slots on said some bushings and located on the sides thereof remote from said inlet and generally oppositely of said first named slots.

4. In a gear pump including:
a housing having an interior wall;
a pumping chamber within said housing and defined by said interior wall;
opposed inlet and outlet ports in said housing extending to said chamber;
a pair of meshed gears within said chamber;
a pair of shafts within said housing and said chamber, each shaft mounting a respective one of the gears of said pair; and
bushings within said chamber journalling said shafts, the radially outer surface of at least some of said bushings and the adjacent portion of said interior wall defining an annular space that is narrow medially of said some and of increasing width axially toward the ends of said some bushings;
the improvement wherein said some bushings, near their ends remote from said gears, at least on their sides remote from said outlet include radially outwardly opening slots extending generally transverse to said shafts, said some bushings having end faces remote from said gears and said interior wall including a relief of a radius intermediate the inner and outer radii of said some bushing; and further including arcuate grooves in said end faces radially overlapping said relief.

5. In a gear pump including:
a housing having an interior wall;
a pumping chamber within said housing and defined by said interior wall;
opposed inlet and outlet ports in said housing extending to said chamber;

a pair of meshed gears within said chamber;
a pair of shafts within said housing and said chamber each shaft mounting a respective one of the gears of said pair; and
bushings within said chamber journalling said shafts of at least some of said bushings having generally barrel shaped exterior surfaces to define an annular space adjacent said interior wall that is narrow medially of said some bushings and of increasing width axially toward the ends of said some bushings to allow said some bushings to pivot in said housing;
the improvement wherein said some bushings, near their ends remote from said gears, on their sides adjacent both said inlet and said outlet include radially outwardly opening slots extending generally at right angles to said shafts and having generally chord-like bottoms, said slots being sufficiently near said ends and extending sufficiently into said bushings as to allow said ends to deflect relative to the remainder of the associated bushing and sealingly engage the adjacent portion of said interior wall when said some bushings pivot in said housing.

6. In a gear pump including:
a housing having an interior wall;
a pumping chamber within said housing and defined by said interior wall;
opposed inlet and outlet ports in said housing extending to said chamber;
a pair of meshed gears within said chamber;
a pair of shafts within said housing and said chamber, each shaft mounting a respective one of the gears of said pair; and
abutting bushings within said chamber journalling an end of each of said shafts, the radially outer surface of at least some of said bushings and the adjacent portion of said interior wall defining an annular space that is narrow medially of said some bushings and of increasing width axially toward the ends of said some bushings to allow said some bushings to pivot in said housing;
the improvement wherein said some bushings, near their ends remote from said gears, at least on their sides remote from said outlet include radially outwardly opening slots extending generally transverse to said shafts, said slots being sufficiently near said ends and extending sufficiently into said bushings as to allow said ends to deflect relative to the remainder of the associated bushing and sealingly engage the adjacent portion of said interior wall when said some bushings pivot in said housing; and
wherein said some bushings, have end faces remote from said gears, and means in at least one of (a) said end faces, and (b) said interior wall adjacent said end faces defining pressure relief means at the interface of said end faces and said interior wall adjacent thereto.

* * * * *